United States Patent
Furukawa et al.

(10) Patent No.: US 9,415,557 B2
(45) Date of Patent: Aug. 16, 2016

(54) ELECTRIC CYLINDER SYSTEM

(75) Inventors: Kyoji Furukawa, Shinshiro (JP); Shigeyuki Takagi, Shinshiro (JP)

(73) Assignee: SINTOKOGIO, LTD., Nagoya-shi, Aichi (JP)

( * ) Notice: Subject to any disclaimer, the term of this patent is extended or adjusted under 35 U.S.C. 154(b) by 352 days.

(21) Appl. No.: 13/979,035

(22) PCT Filed: Jan. 6, 2012

(86) PCT No.: PCT/JP2012/050653
§ 371 (c)(1),
(2), (4) Date: Jul. 10, 2013

(87) PCT Pub. No.: WO2012/096391
PCT Pub. Date: Jul. 19, 2012

(65) Prior Publication Data
US 2013/0291609 A1 Nov. 7, 2013

(30) Foreign Application Priority Data

Jan. 13, 2011 (JP) ................................. 2011-005153

(51) Int. Cl.
*B30B 1/18* (2006.01)
*B30B 15/14* (2006.01)
*B30B 15/00* (2006.01)
*F16H 25/20* (2006.01)

(52) U.S. Cl.
CPC . *B30B 1/181* (2013.01); *B30B 1/18* (2013.01); *B30B 15/0094* (2013.01); *B30B 15/148* (2013.01); *F16H 25/20* (2013.01); *F16H 25/2015* (2013.01); *F16H 2025/2081* (2013.01)

(58) Field of Classification Search
CPC ...... B30B 1/186; B30B 1/181; B30B 15/148; B30B 1/18; B30B 15/0094
See application file for complete search history.

(56) References Cited

U.S. PATENT DOCUMENTS

| | | | | |
|---|---|---|---|---|
| 4,429,579 | A * | 2/1984 | Wilhelm | 73/768 |
| 4,987,528 | A * | 1/1991 | O'Brien | 700/79 |
| 2003/0188644 | A1 | 10/2003 | Winter et al. | |
| 2015/0068412 | A1* | 3/2015 | Yanagi et al. | 100/35 |

FOREIGN PATENT DOCUMENTS

| | | |
|---|---|---|
| CN | 101702930 A | 5/2010 |
| DE | 201 08 706 U1 | 8/2001 |
| DE | 20305789 U1 | 6/2003 |

(Continued)

*Primary Examiner* — Terence Boes
(74) *Attorney, Agent, or Firm* — Drinker Biddle & Reath LLP

(57) ABSTRACT

An electric cylinder system includes: an electric cylinder; and a control section that controls the electric cylinder. The electric cylinder includes: an outer cylinder; a rod configured to be capable of extending and retracting in an axis direction from an opening on one end side of the outer cylinder; a bearing provided on the inside of the outer cylinder; a rotating shaft rotatably supported by the bearing and driven to rotate with driving force of a motor; a screw mechanism that converts a rotary motion of the rotating shaft into a linear motion of the rod and transmits the linear motion; and a load detecting section that detects a load in an axis direction applied to the rod in a position where the load is transmitted from the rod through the screw mechanism. The control section controls the electric cylinder on the basis of a signal from an encoder of the motor and a signal from the load detecting section.

5 Claims, 14 Drawing Sheets

(56) References Cited

FOREIGN PATENT DOCUMENTS

| | | |
|---|---|---|
| DE | 102004054836 A1 | 5/2006 |
| DE | 102005040186 A1 | 3/2007 |
| EP | 0482360 A2 | 4/1992 |
| EP | 2184512 A1 | 5/2010 |
| JP | H05-138481 A | 6/1993 |
| JP | 6-344187 A | 12/1994 |
| JP | 8-117970 A | 5/1996 |
| JP | 2005-138110 A | 6/2005 |
| JP | 2005-254290 A | 9/2005 |
| JP | 2006-232062 A | 9/2006 |
| JP | 2008-144938 A | 6/2008 |
| JP | 2009-121566 A | 6/2009 |
| JP | 2010-169257 A | 8/2010 |
| JP | 2010-284768 A | 12/2010 |
| TW | 200530024 | 9/2005 |

* cited by examiner

ELECTRIC CYLINDER SYSTEM

TECHNICAL FIELD

The present invention relates to an electric cylinder system including an electric cylinder that converts a rotary motion of a motor into a liner motion.

BACKGROUND ART

In the past, as an electric cylinder used in various kinds of apparatuses, for example, there is an electric cylinder described in Japanese Patent Application Laid-Open Publication No. 08-117970 and CN1074820C. This electric cylinder includes a piston attached to a ball nut screwed with a screw stock, a motor that controls to rotate the screw stock, a hollow rod provided on the front surface of the piston, and a supporting member inserted into a hollow portion of the hollow rod and rotatably provided at the distal end of the screw stock. Urethane rubber is attached to a rod head at the distal end of the hollow rod via an attachment plate. A metal protection plate is provided at the distal end of this urethane rubber. This electric cylinder is robust against high temperature and can weaken impact. Therefore, the electric cylinder is suitable for use in a push-out apparatus that pushes out a heavy and hot object and a receiving apparatus that receives the object.

As an electric cylinder system using an electric cylinder or the like, for example, there is an electric cylinder system described in Japanese Patent Application Laid-Open Publication No. 2005-254290. This electric cylinder system includes, as shown in FIG. 13, an electric cylinder 305 including a lifting rod 305c that rises and falls according to the rotation of a motor 305b, a load cell 306 functioning as a load detector coupled to the lifting rod 305c, a position detector (an encoder 305a) that detects the position of the lifting rod 305c, calculating means 308 electrically connected to the load cell 306, and a control section 309 electrically connected to the calculating means 308, the motor 305b, and the position detector (the encoder 305a). Further, the electric cylinder system includes a lower frame 301, a guide rod 302, an upper frame 303, a movable frame 304, a holder 304a, and a pressing member 307. The pressing member 307 is attached to the distal end of the load cell 306 and retains a work 311. On the lower frame 301, a work 312 is placed under the work 311.

In this electric cylinder system, control is performed by a method explained below. Specifically, the method includes: a step of setting pressing speed and a target load; a step of calculating, with calculating means, from the set pressing speed and target load, a speed pattern in which the pressing speed is reduced in proportion to an increase in a load and is reduced to zero when the load reaches the target load; and a step of issuing a command from a control section to a motor and actuating an electric cylinder according to the calculated speed pattern to press a work. At least one deceleration changing point is set in the speed pattern. The deceleration of the pressing speed reduced in proportion to an increase in the load is changed at the deceleration changing point.

CITATION LIST

Patent Literature

Patent Literature 1 Japanese Patent Application Laid-Open Publication No. 08-117970
Patent Literature 2 Chinese Patent Publication No. 1074820C
Patent Literature 3 Japanese Patent Application Laid-Open Publication No. 2005-254290

SUMMARY OF INVENTION

Technical Problem

However, for detecting a load, for example, when a load cell 410 is provided at the distal end of a rod 403 of an electric cylinder 401 (provided before a jig 412) as shown in FIG. 14(a), there are problems explained below. As shown in FIG. 14(a), an output cable 411 is connected to the load cell 410. It is likely that a problem occurs in that, for example, this cable 411 ruptures (a P1 portion, etc.) because of a bending action of the cable 411 due to a repeated reciprocating motion of the rod 403 with respect to an outer cylinder 402. Depending on a machining target by an apparatus, the load cell itself or the output cable interferes with the machining target (a P2 portion, etc.). It is likely that a problem occurs in that, for example, it is necessary to use a jig 413 that is longer than necessary as shown in FIG. 14(b) instead of the jig 412 shown in FIG. 14(a) in order to prevent the interference. When a long jig can cope with the problem because there is a limit in an axis direction, there is a problem in that the electric cylinder could not be used. There are problems in that, for example, in some case, an upper frame and a guide rod are necessary to provide the load cell, this causes complication of the configuration of and an increase in size of an apparatus, and limitations on a system configuration increase. In this way, when the load detection is necessary, it is difficult to simplify the configuration and reduce the length in the axis direction to realize a reduction in size. The system configuration is limited.

In short, in this technical field, there is a demand for an electric cylinder system that can simplify a system configuration and realizes a reduction in size while enabling load detection and position detection.

Solution to Problem

An electric cylinder system according to an embodiment of the present invention includes: an electric cylinder; and a control section that controls the electric cylinder. The electric cylinder includes: an outer cylinder; a rod configured to be capable of extending and retracting in an axis direction from an opening on one end side of the outer cylinder; a bearing provided on an inside of the outer cylinder; a rotating shaft rotatably supported by the bearing and driven to rotate with driving force of a motor; a screw mechanism that converts a rotary motion of the rotating shaft into a linear motion of the rod and transmits the linear motion; and a load detecting section that detects a load in an axis direction applied to the rod in a position where the load is transmitted from the rod through the screw mechanism. The control section controls the electric cylinder on the basis of a signal from an encoder of the motor and a signal from the load detecting section.

Advantageous Effects of Invention

In the electric cylinder according to one aspect of the present invention, the load detecting section detects a load in the axis direction applied to the rod in the position where the load is transmitted from the rod through the screw mechanism. Therefore, it is unnecessary to provide a load cell at the distal end of the rod and the configuration of the electric cylinder can be simplified. It is also unnecessary to provide an output cable or the like that is necessary when a load cell is provided at the distal end of the rod. A deficiency such as a rupture of this cable due to repeated bending can also be prevented. Therefore, in a system that requires load detection and position detection, the electric cylinder according to the one aspect of the present invention can simplify the configuration of the system and realizes a reduction in size of the system. Further, the electric cylinder according to the one aspect of the present invention can realize flexibility of the system configuration and a flexible external configuration of the entire system.

(a) is a perspective view of a strain gauge attachment member to which strain gauges functioning as the strain detecting section are attached. (b) is a plan view of the strain gauge attachment member.

Figure 9:
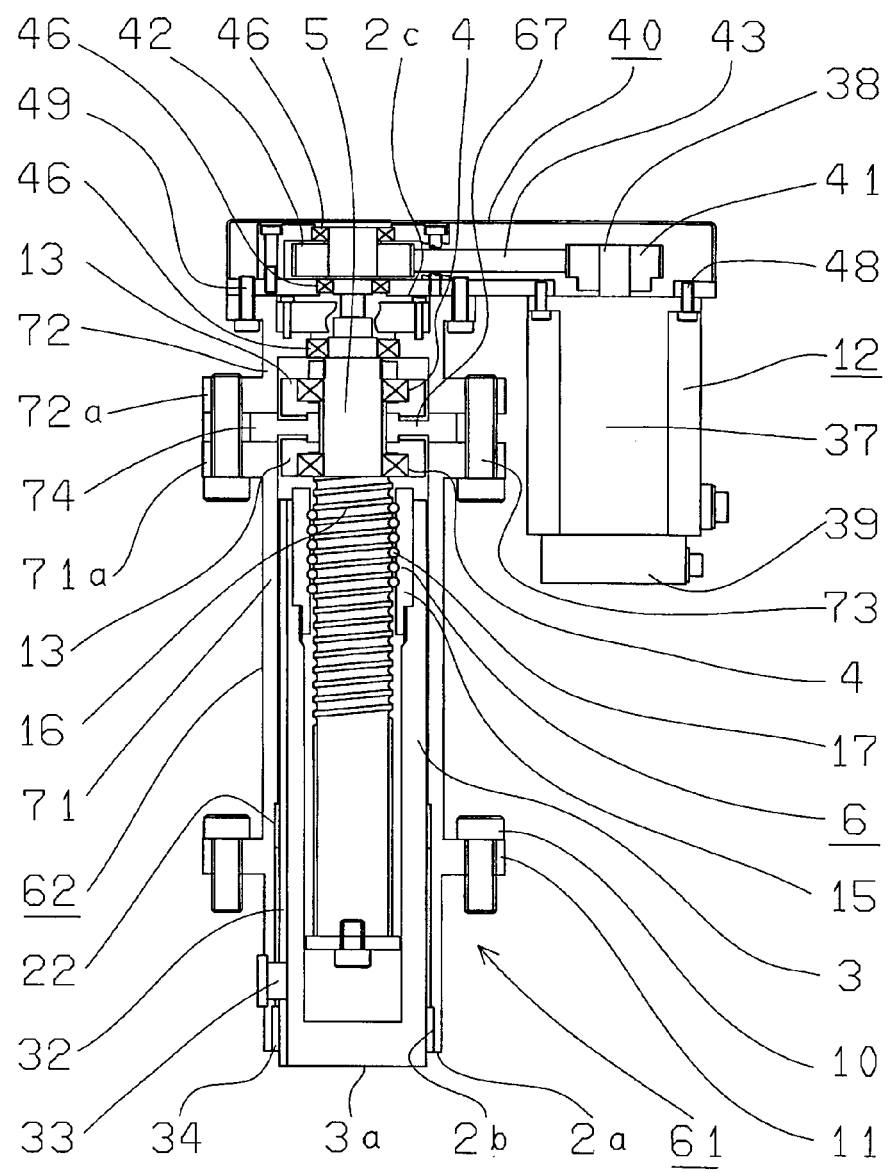
FIG. 9 is a schematic sectional view of another example of the electric cylinder that can be used in the electric cylinder system shown in FIG. 1.
Figure 11:
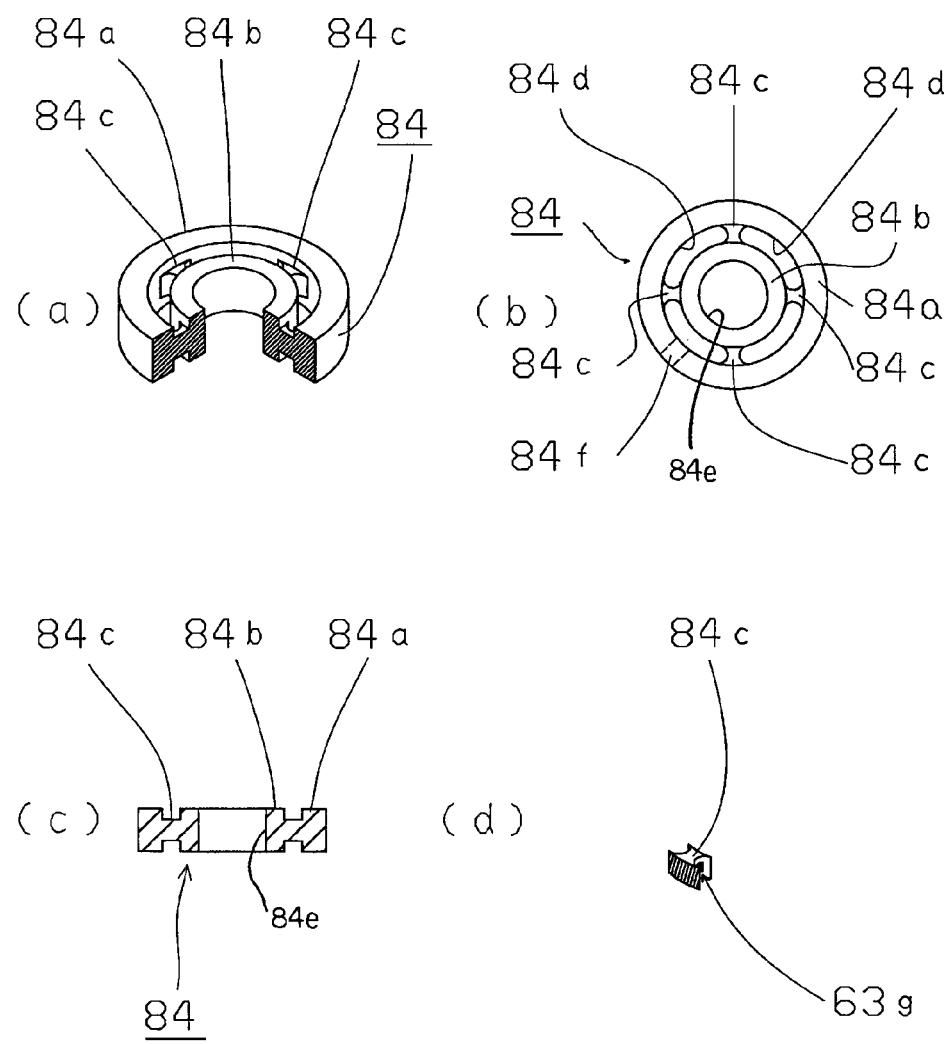

FIG. 11 is a diagram showing another example of the strain detecting section included in the electric cylinder system shown in FIG. 9. (a) is a perspective view of a strain gauge attachment member to which strain gauges functioning as the strain detecting section are attached. (b) is a plan view of the strain gauge attachment member. (c) is a sectional view of the strain gauge attachment member. (d) is a perspective view showing an example of a deformed section of the strain gauge attachment member and a strain gauge attached to the deformed section.

Figure 12:
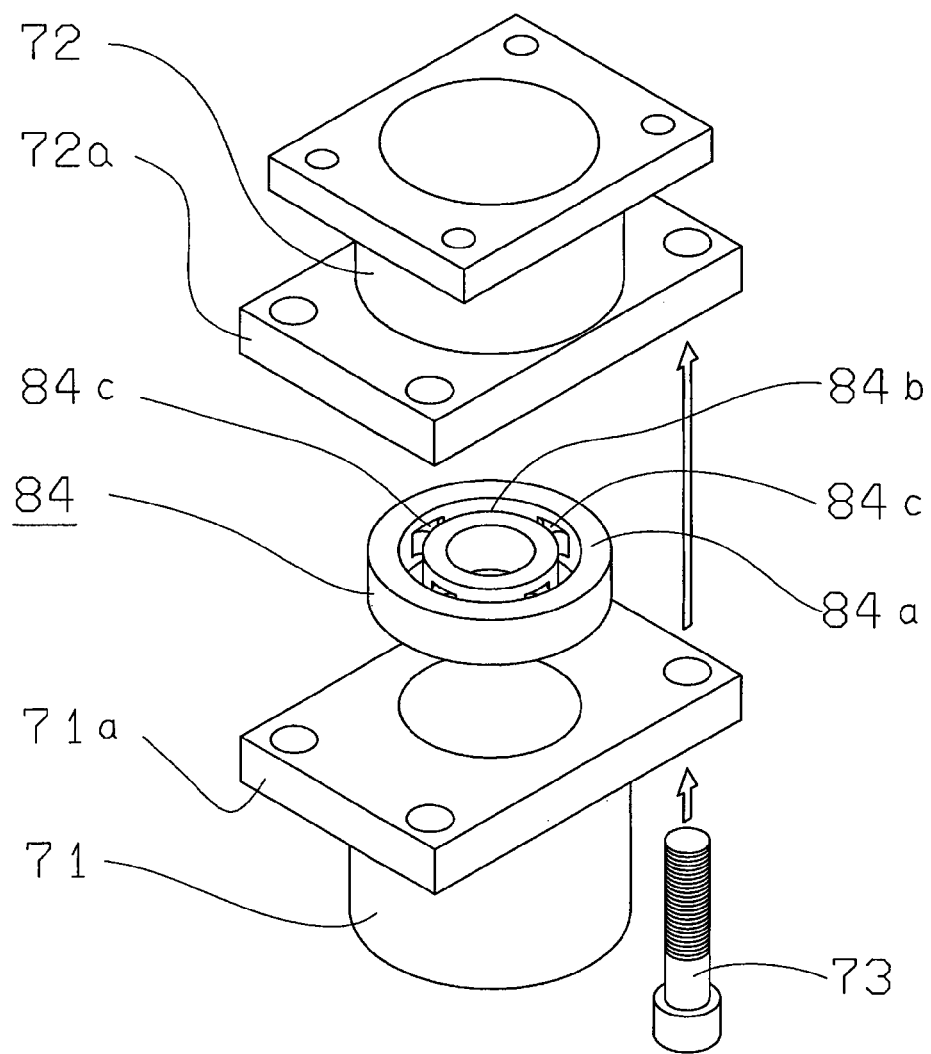

FIG. 12 is a disassembled perspective view showing a relation between the strain gauge attachment member and the outer cylinder shown in FIG. 11.

Figure 13:
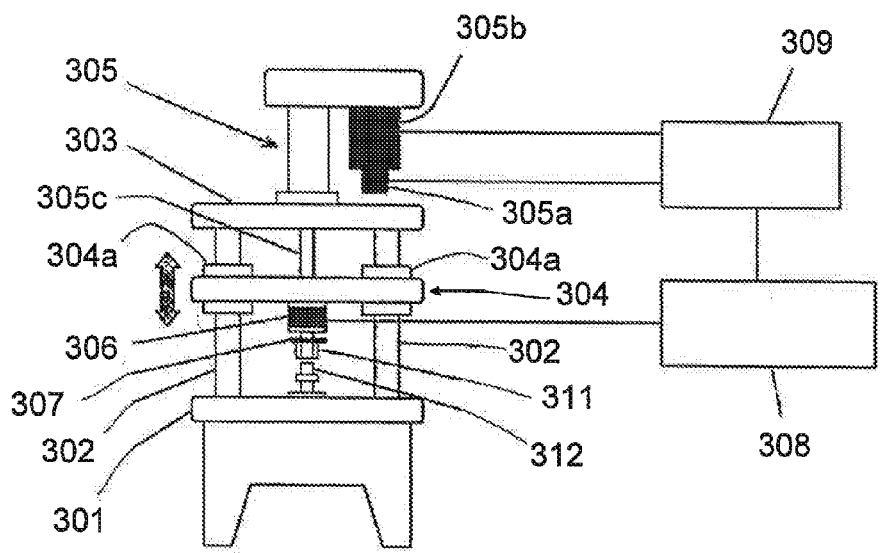

FIG. 13 is a diagram showing an example of an electric cylinder system in the past.

Figure 14:
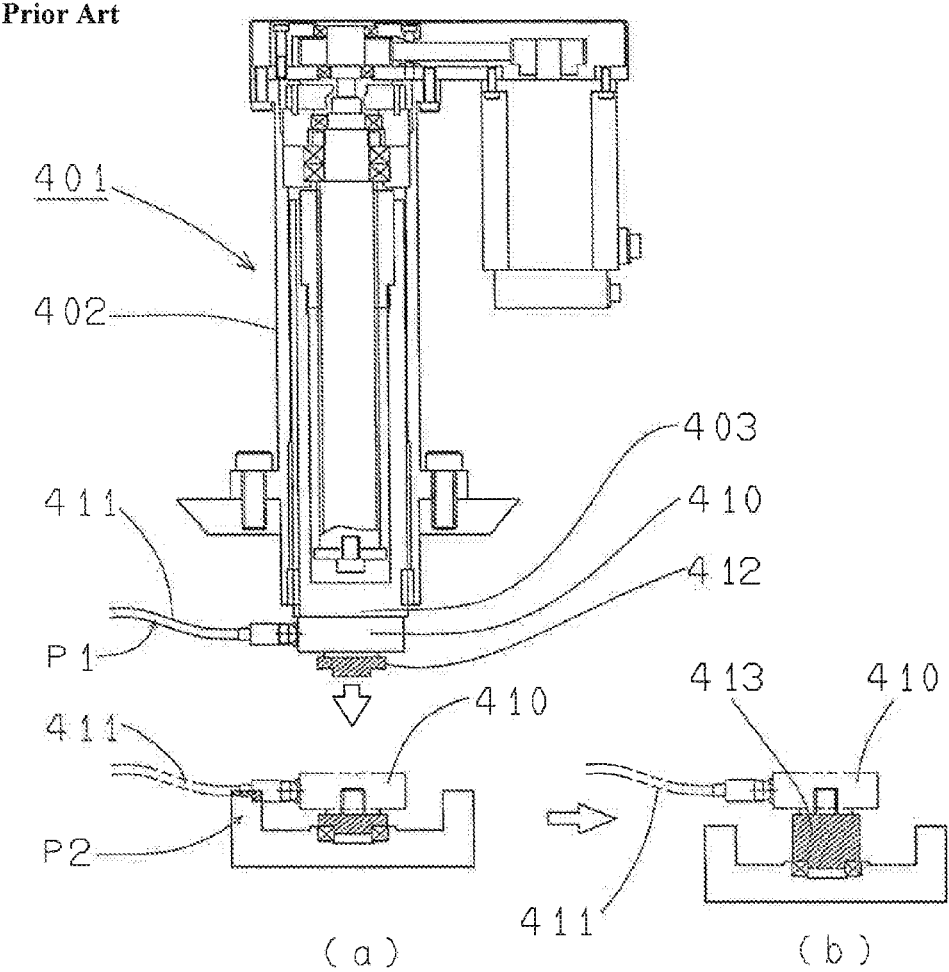

FIG. 14 is a diagram showing a problem that occurs when a load cell is provide at the distal end of the rod of the electric cylinder.

DESCRIPTION OF EMBODIMENTS

Figure 1:
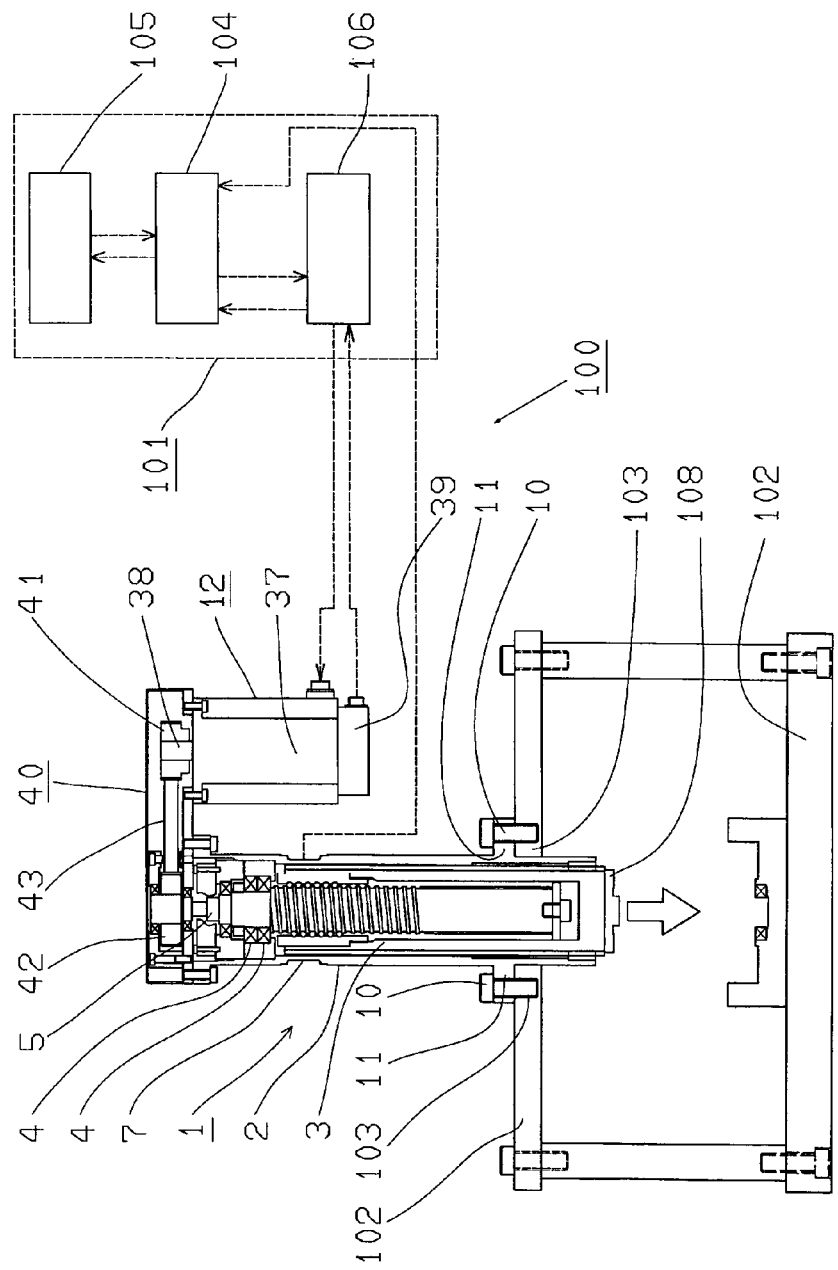
FIG. 1 is a schematic diagram of an electric cylinder system including an electric cylinder according to an embodiment.

An electric cylinder system (an electric servo cylinder system) 100 including an electric cylinder 1 according to an embodiment is explained below with reference to the drawings. The electric cylinder system 100 includes, as shown in FIG. 1, the electric cylinder 1, a control section 101 that controls the electric cylinder, and a system body frame 102 for attaching the electric cylinder 1.

Figure 2:
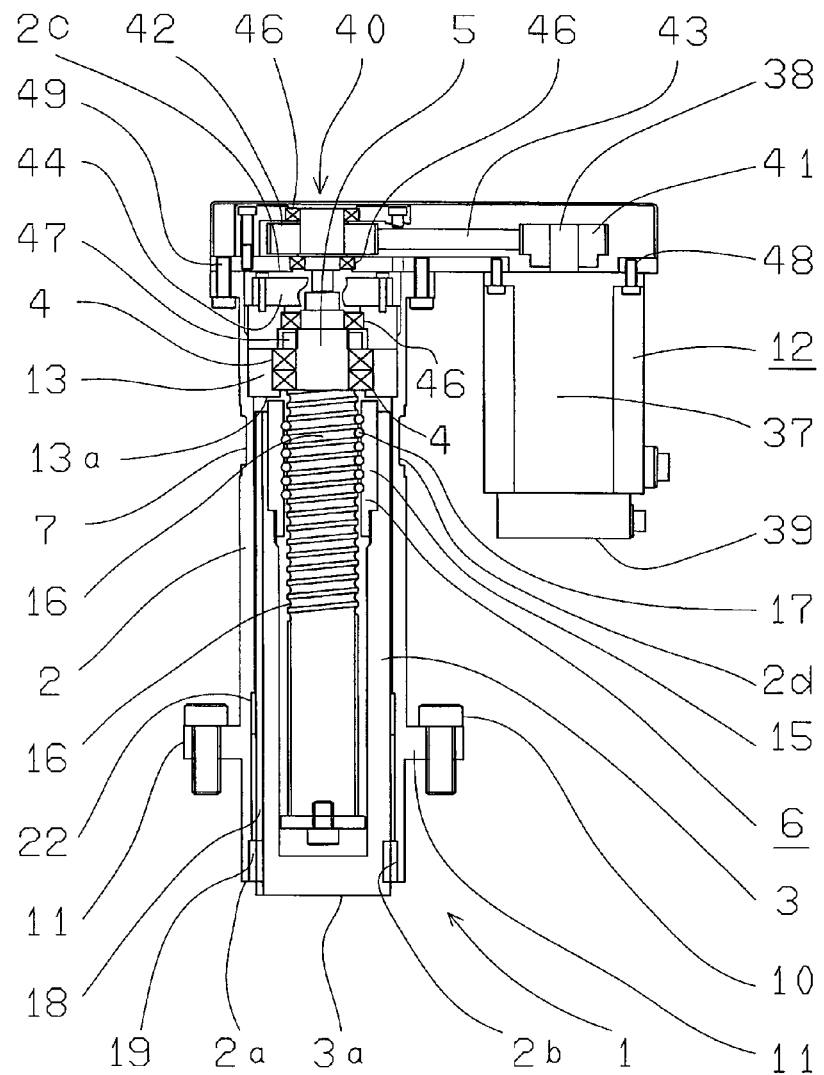
FIG. 2 is a schematic sectional view of the electric cylinder.

The electric cylinder 1 includes, as shown in FIG. 2, an outer cylinder 2, a rod 3, a bearing 4, a rotating shaft 5, a screw mechanism 6, and a strain detecting section 7. The outer cylinder 2 is, for example, a casing having a cylindrical shape and includes, on one end side 2a, a fixing section 11 for fixing the electric cylinder 1 to an attachment place of the electric cylinder 1 (an attachment section 103 of the system body frame 102). The fixing section 11 is, for example, a flange and is fastened to the attachment section 103 of the frame 102 by screws 10 or the like. The electric cylinder 1 is fixed to the system.

The rod 3 is configured to be capable of extending and retracting in an axis direction from an opening 2b on one end side (a side where one end 2a is provided) of the outer cylinder 2. The extension and retraction of the rod 3 means projecting to extend from the opening 2b in the axis direction and retracting from the opening 2b to the inside to retract in the axis direction (retracting in a direction in which a portion projecting from the outer cylinder 2 becomes smaller).

The bearing 4 is provided on the other end side (a side where the other end 2c is provided) of the outer cylinder 2 and on the inside of the outer cylinder 2. The rotating shaft 5 is rotatably supported by the bearing 4 and driven to rotate with driving force of a motor 12. The screw mechanism 6 converts a rotary motion of the rotating shaft 5 into a linear motion of the rod 3 and transmits the liner motion. The strain detecting section 7 is provided in a position on the outer circumference of the outer cylinder 2 and between a position where the bearing 4 is provided and the fixing section 11.

Specifically, the strain detecting section 7 is provided in a position between an end 13a on the fixing section 11 side of a bearing retaining member 13, which is located on the outer circumference of the bearing 4 and retains the bearing 4, and the fixing section 11. This is because the position in the axis direction of the strain detecting section 7 needs to be a position between a position where force in a pulling direction of the bearing 4 is received and the fixing section 11 and a position between a position where force in a compressing direction of the bearing 4 is received and the fixing section 11. The bearing retaining member 13 is a member that transmits a load in a thrust direction (the compressing direction and the pulling direction) received by the bearing 4 to the outer cylinder 2 and is a member that is set in the outer cylinder 2 and retains the bearing 4. The electric cylinder 1 explained herein is configured to provide the bearing retaining member 13 between the bearing 4 and the outer cylinder 2. However, the electric cylinder 1 may be configured not to provide the bearing retaining member. In that case, the strain detecting section is provided in a position between an end on the fixing section side of the bearing and the fixing section.

The strain detecting section 7 detects a load in the axis direction applied to a portion between an attachment position of the bearing 4 in the outer cylinder 2 and the fixing section 11 and converts the load into an electric signal. The outer cylinder 2 is formed in a thin shape having a reduced outer diameter of a portion 2d where the strain detecting section 7 is attached. Since the outer cylinder 2 is formed in such a shape, it is possible to reduce the external dimension of the outer cylinder 2 when a protection cover is provided in the portion 2d of the outer cylinder 2 where the train detecting section 7 is attached. This portion 2d is requested to be formed in thickness for obtaining a sectional area resistible against thrust and thin enough for detecting, with strain gauges explained later, reaction applied to the outer cylinder 2. In this point of view, it is also convenient to form the outer cylinder 2 in the thin shape.

Figure 3:
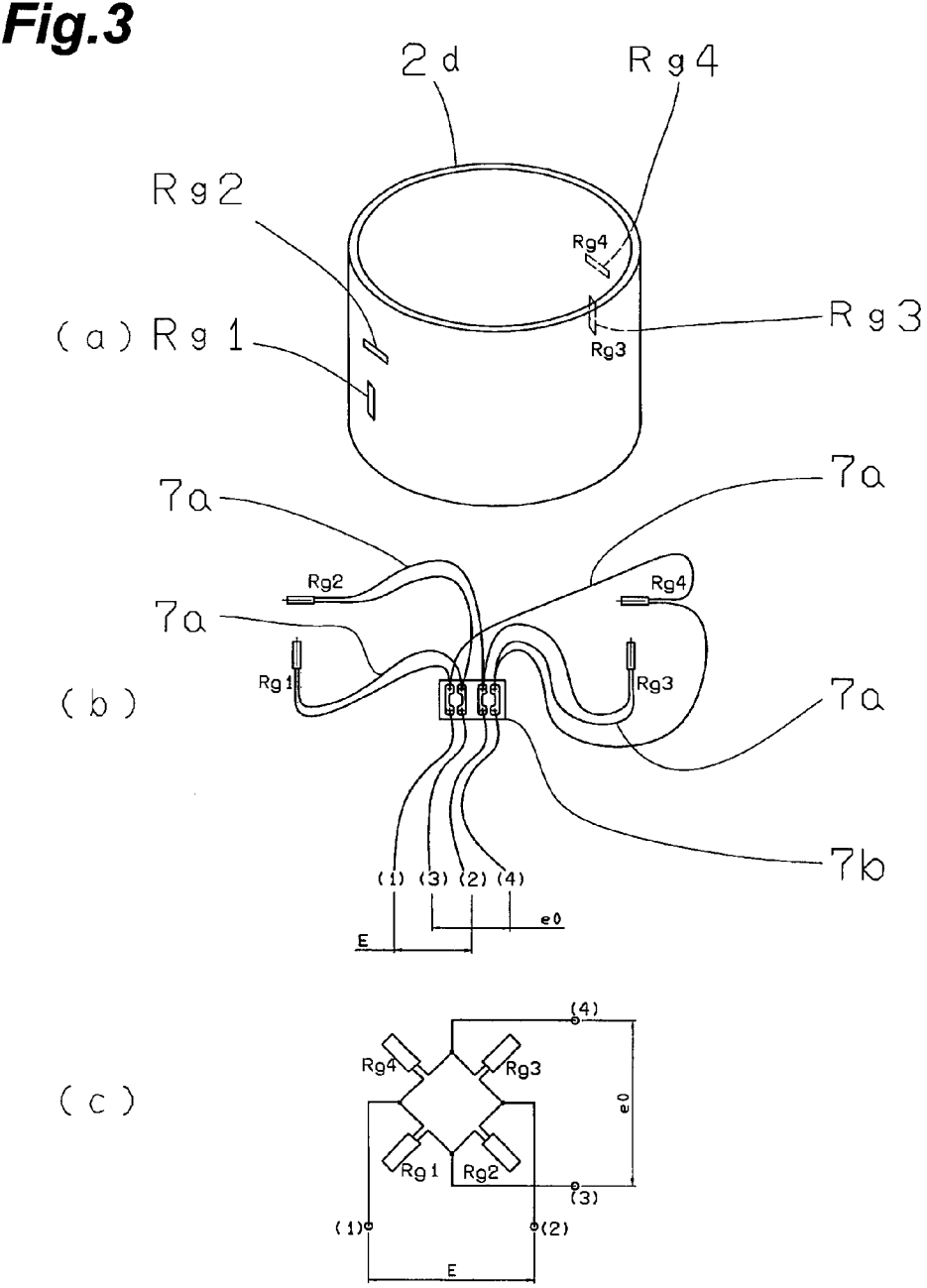
FIG. 3 is a diagram for explaining a strain detecting section included in the electric cylinder. (a) is a perspective view showing an example of a state in which strain gauges are attached to an outer cylinder. (b) is a schematic diagram showing a state of wires that connect the strain gauges. (c) is a wiring diagram for showing that a Wheatstone bridge is formed by the strain gauges and the wires.

The strain detecting section 7 includes, for example, plural strain gauges Rg1 to Rg4 arranged as shown in FIG. 3. For easy understanding of explanation, FIG. 3 shows only the portion 2d of the outer cylinder 2, which is formed in the thin shape, for attachment of the detecting section. Actually, the same members are continuously provided above and under the portion 2d. The strain detecting section 7 includes connection wires 7a that connect the strain gauges Rg1 to Rg4 and includes a terminal table 7b according to necessity. For example, E between (1) and (2) shown in FIGS. 3(b) and 3(c) represents an applied voltage and e0 between (3) and (4) represents an output voltage. A Wheatstone bridge is formed by the gauges as shown in FIG. 3(c). Therefore, a voltage signal proportional to the applied voltage and proportional to a strain is output. The output of the strain detecting section 7 is sent to a first controller 104 of a control section 101 as shown in FIG. 1.

The rod 3 is formed in a cylindrical shape through which the rotating shaft 5 can be inserted. The outer diameter of the rod 3 is formed smaller than the inner diameter of the outer cylinder 2. The screw mechanism 6 is a ball screw. The screw mechanism 6 may be, for example, a trapezoidal thread or a square thread. The trapezoidal thread refers to a thread, the cross section of an external thread and an internal thread of which is trapezoidal. The square thread refers to a thread, the cross section of an external thread and an internal thread of which is rectangular. Besides, a mechanical element that receives a load in the axis direction and converts a rotary motion into a linear motion may be used. In the rod 3 explained herein, a nut member 15 of the screw mechanism 6, which is the ball screw, is integrated. An external thread portion 16 integrated with the rotating shaft 5 configures a ball screw together with the nut member 15 and a ball 17.

Figure 4:
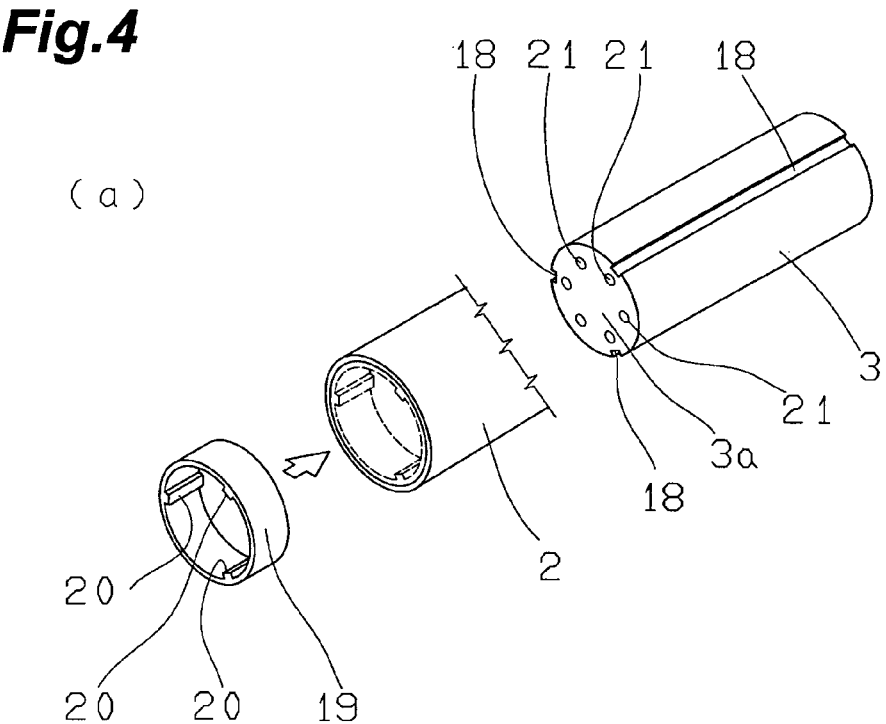
FIG. 4 is a diagram for explaining a member that regulates the rotation of a rod of the electric cylinder. (a) is a perspective view showing a relation between grooves formed on the outer surface of the rod and projections provided in a bush member press-fit in the outer cylinder. (b) is a sectional view of the bush member, the rod, and the outer cylinder. (c) is an enlarged sectional view of the groove and the projection that are main parts of (b). (d) is a sectional view of the bush member, the rod, and the outer cylinder for swing prevention.
Figure 4:
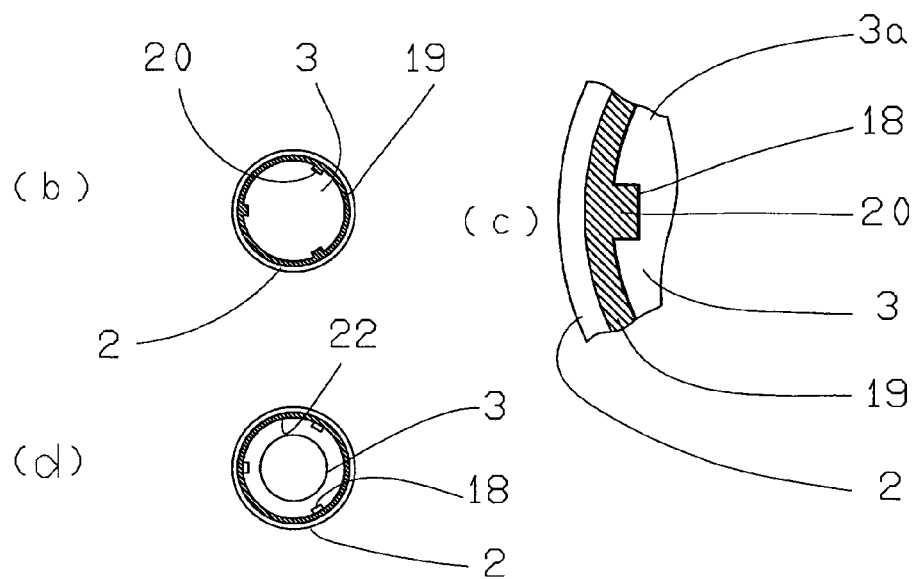

One or plural grooves 18 formed in the axis direction are provided on the outer circumference of the end 3a of the rod 3. Here, as shown in FIG. 4(a), the grooves 18 are provided in three places at equal intervals in the circumferential direction. This end 3a is an end on a side projecting from the opening 2b on the one end side 2a of the outer cylinder 2. On the other hand, a bush member 19 fit in by press-fitting (close fit) is attached to the inner side of the opening 2b on the one end side 2a of the outer cylinder 2. On the inner surface of the bush member 19, as shown in FIGS. 4(a) and 4(b), one or plural projections 20 corresponding to the grooves 18 are formed. Here, the projections 20 are provided in three places. The bush member 19 assumes a shape having the projections 20 formed in the axis direction on the inner surface of a cylinder. The projections 20 engage with the grooves 18 to regulate the rotation of the rod 3. Between the projections 20 and the grooves 18, as shown in FIG. 4(c), very small gaps enough for enabling the rod 3 to slide in the axis direction with respect to the outer cylinder 2 are formed. Similarly, very small gaps enough for enabling the rod 3 to slide in the axis direction with respect to the outer cylinder 2 are also formed between the inner surface of the bush member 19 and the outer surface of the rod 3. As shown in FIG. 4(a), at an end 3a as the distal end of the rod 3, bolt holes 21 for attaching a jig (e.g., a jig for press-fitting 108 shown, in FIG. 1) is provided according to necessity of the configuration of the electric cylinder system 100.

The bush member 19 explained in FIGS. 4(a) to 4(c) is a bush member for rotation regulation. In the outer cylinder 2, a bush member 22 for swing prevention is further provided. As shown in FIG. 4(d), this bush member 22 is formed in a cylindrical shape and fit in the outer cylinder 2 by press-fitting. Between the inner surface of the bush member 22 and the outer surface of the rod 3, a very small gap enough for enabling the rod 3 to slide with respect to the outer cylinder 2 is formed. As shown in FIG. 2, the bush member 19 and the bush member 22 are arranged at a predetermined distance from each other. The bush member 19 and the bush member 22 prevent the rod 3 from swinging to tilt with respect to the axis. If the rod 3 swings, the function of the screw mechanism 6 cannot be displayed, i.e., unnecessary force is generated in the ball screw section. Further, it is likely that a problem occurs in that partial wear or the like occurs in components of the ball screw section and the screw mechanism is damaged. The bush member 19 and the bush member 22 prevent such a problem. As explained above, the bush member 19 includes both the rotation regulating function and the swing preventing function.

Figure 5:
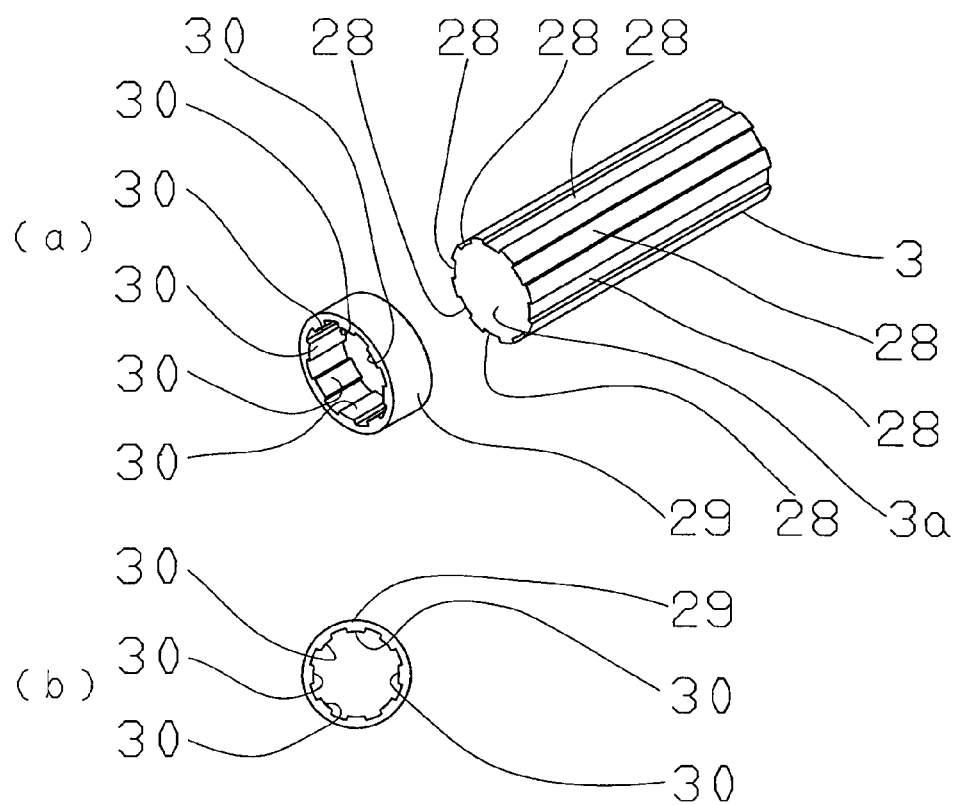
FIG. 5 is a diagram showing another example of a member that regulates the rotation of the rod of the electric cylinder and a diagram of an example in which grooves and projections having a spline shape are adopted. (a) is a perspective view showing a relation between the grooves formed on the outer surface of the rod and the projections provided in the bush member press-fit in the outer cylinder in this modification. (b) is a sectional view of the bush member shown in (a).

The configurations of the bush member and the grooves for rotation regulation included in the electric cylinder 1 are not limited to the above. For example, a bush member including grooves and projections having a spline shape such as a square spline of JIS (Japanese Industrial Standards) B 1601, an involute spline of JIS B 1603, or a ball spline of JIS B 1193 may be configured. For example, the electric cylinder 1 may be configured to include grooves 28 and a bush member 29 shown in FIG. 5 instead of the grooves 18 and the bush member 19 explained above. As shown in FIG. 5(a), like the grooves 18, the grooves 28 are provided from the end 3a in the axis direction on the outer circumference of the rod 3. The grooves 28 are provided in eight places at equal intervals in the circumferential direction. On the inner surface of the bush member 29 press-fit in the outer cylinder 2, as shown in FIGS. 5(a) and 5(b), plural projections 30 corresponding to the grooves 28 are formed. Here, the projections 30 are provided in eight places. The projections 30 engage with the grooves 28 to regulate the rotation of the rod 3. Appropriate gaps are formed between the projections 30 and the grooves 28. An appropriate gap is also formed between the inner surface of the bush member 29 and the outer surface of the rod 3. The rod 3 is enabled to slide in the axis direction with respect to the outer cylinder 2.

The rotation regulating mechanism included in the electric cylinder 1 is not limited to a bush structure using the bush member 19 or 29. In other words, the rotation regulating mechanism may be a structure including a slip key shown in FIG. 6. Specifically, the rotation regulating mechanism may be configured to include a groove 32 and a key member 33 instead of the grooves 18 and the bush member 19 explained above. When the slip key structure is adopted, it is necessary to provide a cylindrical bush member 34 including only a swing preventing mechanism same as that of the bush member 22 explained above. The key member 33 is attached to an opening 33a, which is provided in the outer cylinder 2, by a screw member 33b. The key member 33 includes a projection 33c that projects to the groove 32 side when the key member 33 is attached to the outer cylinder 2. The projection 33c engages with the groove 32 to regulate the rotation of the rod 3. Between the projection 33c and the grooves 32, a very small gap enough for enabling the rod 3 to slide in the axis direction with respect to the outer cylinder 2 is formed.

Figure 7:
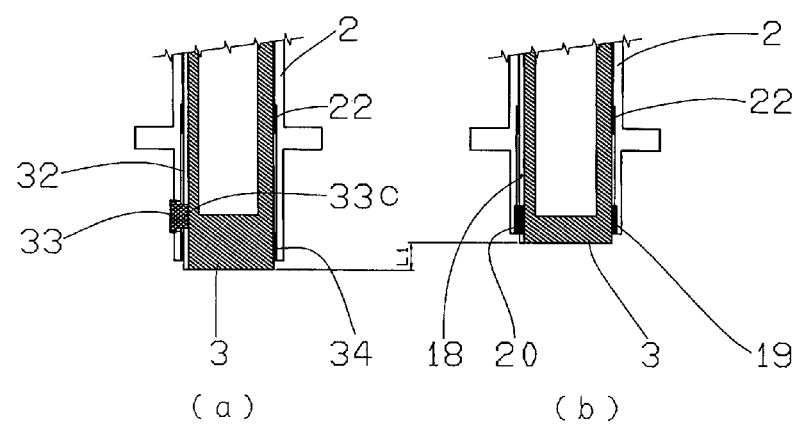
FIG. 7 is a diagram for comparing a rotation regulating mechanism of a bush structure shown in FIGS. 4 and 5 and a rotation regulating mechanism of the slip key structure shown in FIG. 6. (a) is a sectional view showing the rotation regulating mechanism of the slip key structure shown in FIG. 6. (b) is a sectional view showing the rotation regulating mechanism of the bush structure shown in FIG. 4.

In the rotation regulating mechanism explained above, the bush structure using the bush member 19 or 29 is advantageous from the viewpoint that the length in the axis direction of the electric cylinder 1 is reduced compared with the slip key structure using the key member 33 and the viewpoint of simplification of the configuration. This point is explained with reference to FIG. 7. When the slip key structure is adopted as shown in FIG. 7(a) (when the key member 33 and the like are used), the portion of the bush member 34 for swing prevention in the groove 32 provided in the rod 3 cannot be used for rotation regulation. On the other hand, when the bush structure is adopted as shown in FIG. 7(b) (when the bush member 19 and the like are used), the grooves 18 provided in the rod 3 to the distal end of the rod 3 can be used for rotation regulation. Therefore, when the bush structure is adopted, the dimension in the axis direction can be further reduced by L1 shown in FIG. 7.

The motor 12 includes a motor body 37, an output shaft 38, and an encoder 39. The electric cylinder 1 includes a transmission mechanism 40 that transmits the torque of the output shaft 38 of the motor 12 to the rotating shaft 5. The transmission mechanism 40 includes a timing pulley 41 connected to the output shaft 38, a timing pulley 42 connected to the rotating shaft 5, and a timing belt 43 wound around between the timing pulleys 41 and 42. The transmission mechanism 40 can transmit the torque of the output shaft 38 to the rotating shaft 5. When the torque is transmitted, a speed reduction or a speed increase can be performed at desired deceleration by changing a relation between the sizes of the diameters of the timing pulleys 41 and 42. The rotating shaft 5 is configured to receive force in the rotating direction with plural bearings 46 in the outer cylinder 2 and the transmission mechanism 40. The bearings 46 are so-called radial bearings. On the other hand, the bearing 4 explained above is configured to receive thrust applied to the rotating shaft 5. This bearing 4 is a so-called thrust bearing and is integrated with the rotating shaft 5 by a bearing nut 47. The bearing 4 is fit in the bearing retaining member 13 explained above.

The motor 12 is arranged to set the output shaft 38 parallel to the rotating shaft 5 and provided in a position where the motor 12 is orthogonal to the outer cylinder 2 in the axis direction. In other words, the motor 12 is arranged such that the output shaft 38 and the rotating shaft 5 do not coincide with each other to form a C shape (a U shape) as a whole. In other words, the rotating shaft 5 and the output shaft 38 are arranged to be faced in the same direction with respect to the transmission mechanism 40. Therefore, the rotating shaft 5 and the output shaft 38 can be arranged in positions where the outer cylinder 2 and the motor body 37 overlap in the axis direction, i.e., the dimension in the axis direction of the entire apparatus can be reduced. In the electric cylinder 1, without providing the transmission mechanism 40, the motor 12 may be arranged such that the output shaft 38 and the rotating shaft 5 coincide with each other (located on extended lines each other) and arranged to form an I shape as a whole. In this case, the transmission mechanism 40 is unnecessary. However, the dimension in the axis direction of the entire apparatus can be set shorter in the electric cylinder 1 explained with reference to FIG. 2, which is advantageous from this viewpoint. The motor 12 and the transmission mechanism 40 are fixed to be integrated by bolts 48. The outer cylinder 2 and the transmission mechanism 40 are fixed to be integrated by bolts 49.

A reduction gear 44 is arranged between the rotating shaft 5 and the transmission mechanism 40. Since the electric cylinder 1 includes the reduction gear 44, the electric cylinder 1 can rotate the rotating shaft 5 with desired force and at desired speed and insert and extract the rod 3 with desired thrust and at desired speed. It is likely that the pulleys of the transmission mechanism are increased in size and the entire apparatus is too large when the electric cylinder 1 relies on only a speed reduction of the transmission mechanism 40. However, since the electric cylinder 1 includes the reduction gear 44, it is possible to solve such a problem and reduce the size of the apparatus. The reduction gear can also be arranged between the motor 12 and the transmission mechanism 40. However, effects explained below are obtained by arranging the reduction gear between the rotating shaft 5 and the transmission mechanism 40 as shown in FIG. 2. Specifically, when the reduction gear is arranged on the motor 12 side, an end (in FIG. 2, the lower end) of the motor 12 is closer to the system body frame 102 side of the electric cylinder system 100. For convenience of the entire system, in some case, it is desired to perform a design change to move the fixing section 11, which is an attachment section of the outer cylinder 2, to the transmission mechanism 40 side (in FIG. 2, the upper side). However, when the reduction gear is arranged on the motor 12 side, the motor 12 interferes with the body frame 102 and the design change cannot be performed. In other words, a degree of freedom of the entire system falls. In the electric cylinder 1 shown in FIG. 2, the reduction gear 44 is arranged between the rotating shaft 5 and the transmission mechanism 40. Therefore, it is possible to prevent the problem and improve a degree of freedom of the entire system of the electric cylinder system 100.

Figure 8:
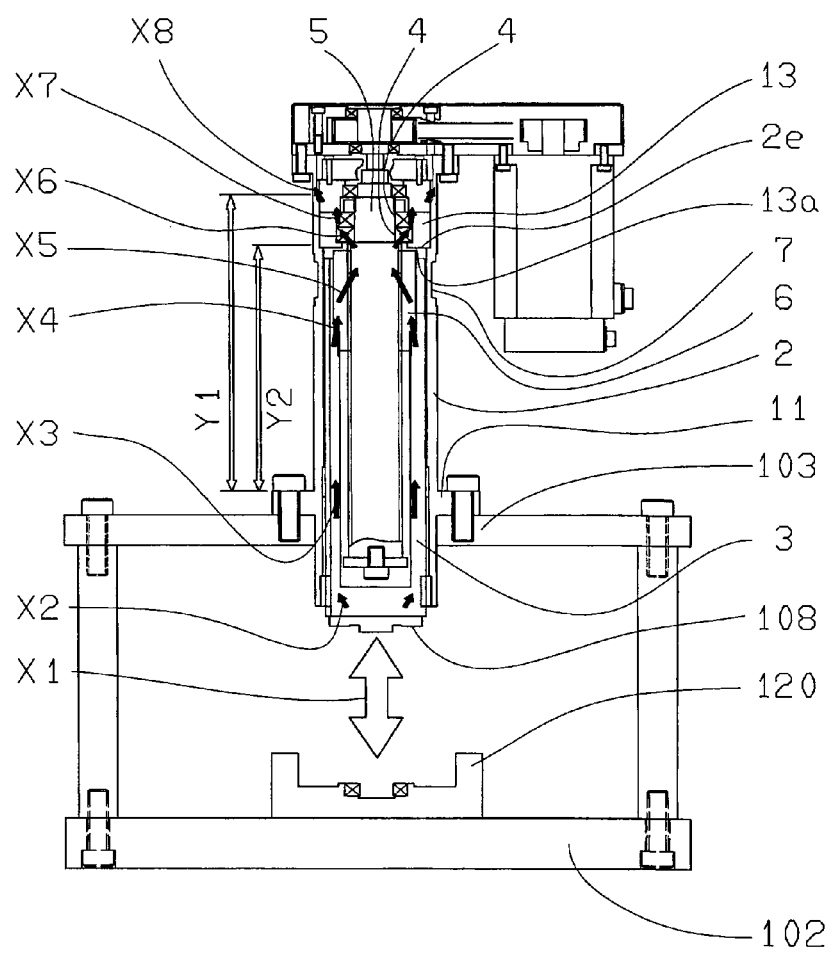
FIG. 8 is a diagram for explaining a range in which a load in the axis direction applied to the rod as reaction is transmitted from the rod through a screw mechanism.

With the electric cylinder 1 explained above, for example, when a work piece 120 is pressed as shown in FIG. 8, a load X1 of the pressing changes to reaction and is transmitted through the members as indicated by arrows X2 to X8. Tensile force is generated in a portion indicated by an arrow Y1 of the outer cylinder 2 fixed in the fixing section 11. When the electric cylinder 1 is used to apply force, for example, in a direction opposite to the direction shown in FIG. 8, reaction is transmitted to portions of the arrows X2 to X5 through the members. The reaction is transmitted from the end 13a on the fixing section 11 side of the bearing retaining member 13 in a downward direction in the figure to a contact section 2e of the outer cylinder 2. Compression force is generated in a portion indicated by an arrow Y2 of the outer cylinder 2 fixed in the fixing section 11. The strain detecting section 7 is located on the outer side of the nut member 15 of the ball spring as shown in FIG. 2. In other words, the strain detecting section 7 is provided in a position between the end 13a on the fixing section 11 side of the bearing retaining member 13, which is located on the outer circumference of the bearing 4 and retains the bearing, and the fixing section 11. Therefore, even when a range in which the tensile force indicated by Y1 is applied is taken into account or even when a range in which the compression force indicated by Y2 is applied is taken into account, the strain detecting section 7 can detect a load (reaction) in the axis direction applied to the rod 3.

In this electric cylinder 1, since the outer cylinder 2 is machined out from a metal material, the outer cylinder 2 is formed as a so-called integral object (a single member) including the fixing section 11. Therefore, the configuration is simplified. Since the reaction is appropriately transmitted, detection of the reaction by the strain detecting section 7 is realized. A cylindrical member and a flange member functioning as the fixing section 11 may be configured to be an integral object by welding. In view of the fact that external force other than the reaction is not generated in the structure peculiar to the electric cylinder, i.e., the outer cylinder 2, the strain detecting section 7 may be provided in the portion of this outer cylinder 2 where the tensile force and the compression force explained above are applied as the reaction. In other words, the outer cylinder 2 functioning as the casing is also used as the attachment section of the strain detecting section to realize simplification of the configuration of the electric cylinder and appropriate load detection in the axis direction.

As explained above, the electric cylinder 1 includes the outer cylinder 2, the rod 3, the bearing 4, the rotating shaft 5, the screw mechanism 6, and the strain detecting section 7 explained above and can perform load detection with the strain detecting section 7 provided in the outer cylinder 2. Therefore, it is unnecessary to separately provide a load cell or the like and simplification of the configuration can be realized.

In the electric cylinder 1, it is also unnecessary to provide an output cable (an output cable having slack to allow an end on a movable side move together with the distal end of the rod) or the like that is necessary when a load cell is provided at the distal end of the rod. The electric cylinder 1 can prevent a deficiency such as a rupture of this cable due to repeated bending. Therefore, when load detection is necessary, the electric cylinder 1 can simplify the configuration and reduces the length in the axis direction to realize a reduction in size of the apparatus.

Further, the electric cylinder 1 can realize flexibility of the configuration in the electric cylinder system 100 including the electric cylinder 1 (the system configuration). In other words, the electric cylinder 1 realizes a flexible external configuration of the entire system through a reduction in length in the axis direction and a reduction in size of the electric cylinder itself.

The electric cylinder system 100 including this electric cylinder 1 is explained. As shown in FIG. 1, the control section 101 provided in the electric cylinder system 100 includes a first controller 104 that receives a detection signal from the strain detecting section 7, a second controller 105 that performs an operation instruction corresponding to a peripheral apparatus and a work state, and a motor driver 106 that controls to drive the motor 12 and receives a signal from the encoder 39 of the motor 12.

The motor driver 106 performs rotation control (a rotation command) for the motor 12 on the basis of a command of an operation condition from the first controller 104. The motor driver 106 receives a signal of the number of encoder pulses from the encoder 39 and transmits various kinds of information of the motor 12 including this received information to the first controller 104. The first controller 104 receives the information from the encoder 39 and receives a detection output signal of load in the axis direction applied from the strain detecting section 7 to the rod 3, i.e., an output proportional to the load (thrust). The second controller 105 is a programmable logic controller. The second controller 105 receives the various kinds of information from the first controller 104 and gives the first controller 104 an operation instruction or the like corresponding to a peripheral apparatus and a work state for performing input and extraction of components. The first controller 104 monitors, whenever necessary, the position of the rod 3 and a load in the axis direction applied to the rod 3, sets and calculates an operation condition in the next control cycle, and performs an instruction (control) for the motor driver 106. As explained above, the control section 101 controls the electric cylinder 1 on the basis of a signal from the encoder 39 of the motor 12 and a signal from the strain detecting section 7 functioning as load detecting means (a load detecting section).

The electric cylinder system 100 includes the electric cylinder 1 and the control section 101 that controls the electric cylinder 1. The electric cylinder 1 includes the outer cylinder 2, the rod 3, the bearing 4, the rotating shaft 5, the screw mechanism 6 that converts a rotary motion of the rotating shaft 5 into a linear motion of the rod 3 and transmits the linear action, and the strain detecting section 7 functioning as the load detecting means that detects the load in the axis direction applied to the rod 3 in a position where the load is transmitted from the rod 3 through the screw mechanism 6. The electric cylinder 1 may have the configuration in which the control section 101 controls the electric cylinder 1 on the basis of a signal from the encoder 39 of the motor 12 and a signal from the load detecting means (the strain detecting section 7). The electric cylinder system 100 makes the system configuration simple and flexible and realizes the execution of load detection and position detection.

In short, in the electric cylinder system 100, the strain detecting section 7 functioning as the load detecting means detects a load in the axis direction applied to the rod 3 in the position where the load is transmitted from the rod 3 through the screw mechanism 6. Therefore, it is unnecessary to provide a load cell at the distal end of the rod 3 and the configuration can be simplified. In other words, the electric cylinder system 100 may have the configuration in which the load detecting means is not provided in the rod 3 that acts to extend and retract but is provided on the outer cylinder 2 side, which can also be considered as a fixed side. It is also unnecessary to provide an output cable or the like that is necessary when a load cell is provided at the distal end of the rod. It is also possible to prevent a deficiency such as a rupture of this cable due to repeated bending. Therefore, in a system that requires load detection and position detection, the configuration can be simplified and a reduction in size is realized. Further, flexibility of a system configuration and a flexible external configuration of the entire system are realized.

Since the electric cylinder 1 is used, the electric cylinder system 100 also has the advantageous effects of the electric cylinder 1 itself explained above. An electric cylinder used in this electric cylinder system 100 is not limited to the electric cylinder 1 explained above. The electric cylinder only has to be an electric cylinder including an outer cylinder, a rod, a bearing, a rotating shaft, a screw mechanism, and load detecting means for detecting a load in the axis direction applied to the rod in a position where the load is transmitted from the rod through the screw mechanism. For example, an electric cylinder 61 shown in FIG. 9 may be used.

The electric cylinder 61 that can be used in the electric cylinder system 100 is explained. The electric cylinder 61 is the same as the electric cylinder 1 explained above except that the configuration of load detecting means is different. Therefore, the same portions (components) are denoted by the same reference numerals and signs and detailed explanation of the portions is omitted. Specifically, the electric cylinder 61 is different from the electric cylinder 1 in that, whereas the strain detecting section 7 is provided in the predetermined position on the outer circumference of the outer cylinder 2 in the electric cylinder 1, a strain detecting section 67 is provided in a member fixed integrally with an outer cylinder 62 in the electric cylinder 61.

Specifically, the electric cylinder 61 includes, as shown in FIG. 9, the outer cylinder 62, the rod 3, the bearing 4, the rotating shaft 5, the screw mechanism 6, and the strain detecting section 67. The outer cylinder 62 is the same as the outer cylinder 2 explained above in that the outer cylinder 62 is a cylindrical casing. However, the outer cylinder 62 is formed in structure in which flange sections 71a and 72a, in which a first cylinder 71 and a second cylinder 72 on the distal end side of the outer cylinder 62 are respectively provided, are integrally fixed by bolts 73. In the outer cylinder 62, the fixing section 11 for fixing the electric cylinder 61 to the attachment section 103 of the system body frame 102 is provided on the one end side 2a on the side where the first cylinder 71 is provided.

Figure 10:
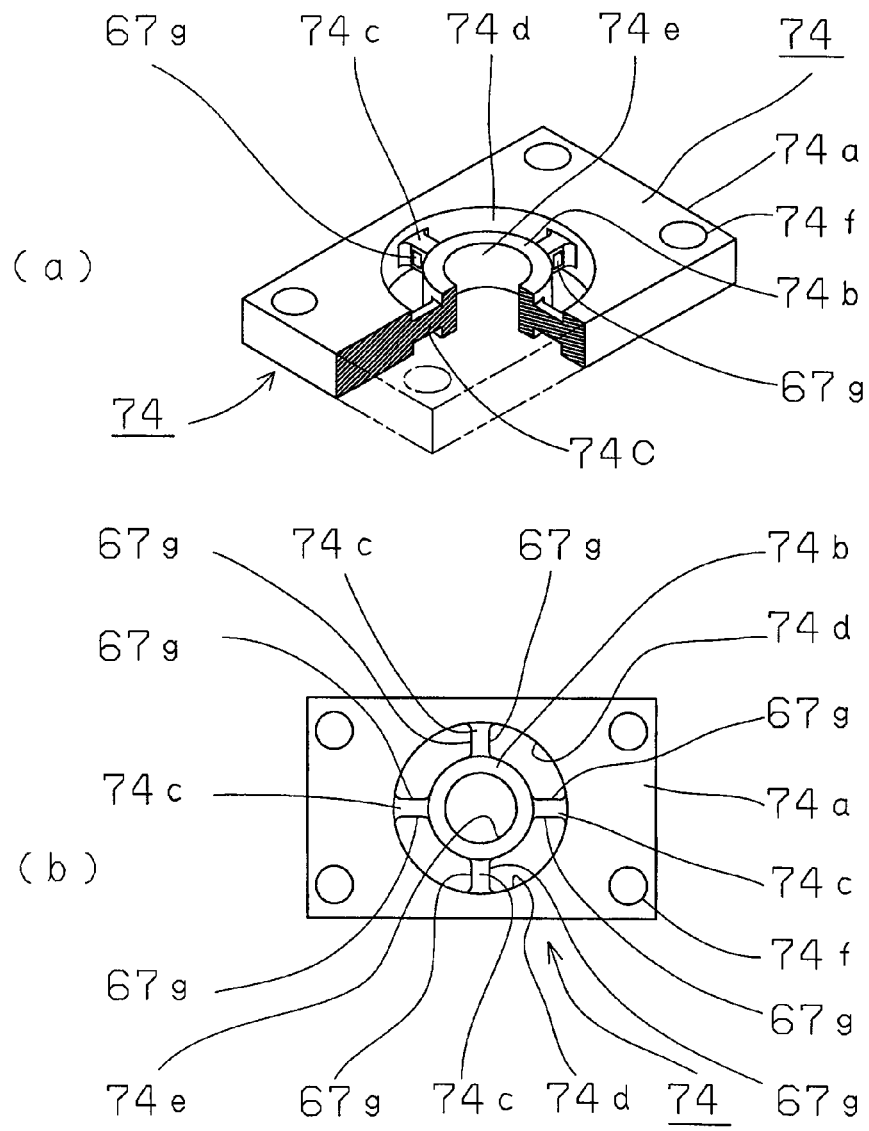
FIG. 10 is a diagram for explaining a strain detecting section included in the electric cylinder system shown in FIG. 9.

The strain detecting section 67 is provided in a position where a load in the axis direction applied to the rod 3 is transmitted through the screw mechanism 6. Specifically, the strain detecting section 67 is provided in a plate-like member (plane-member) 74 held between two members (the first cylinder 71 and the second cylinder 72) included in the outer cylinder 62. This plate-like member 74 is a strain gauge attachment member. The plate-like member 74 is configured to include, as shown in FIG. 10, a fixing section 74a held between the first and second cylinders 71 and 72, which are provided on the outer circumference, because plural cut-out holes 74d and 74e are provided, a load receiving section 74b that is provided in the center and receives a load in the axis direction applied to the rod 3, and sensing sections 74c for coupling the fixing section 74a and the load receiving section 74b and sensing a strain. FIG. 10(a) is a perspective view of the plate-like member 74 functioning as a strain gauge attachment member. However, the plate-like member 74 is shown with a part thereof cut away for understanding of the structure of the fixing section 74a, the sensing sections 74c, the load receiving section 74b, and the like.

In the plate-like member 74, holes 74f for inserting through the bolts 73 are provided. The fixing section 74a side of the plate-like member 74 is held between the flange sections 71a and 71b, whereby the plate-like member 74 is fixed to the outer cylinder 62. The load receiving section 74b receives, via the bearing retaining member 13, a load in the thrust direction received by the bearing 4. When a load in the axis direction applied to the rod 3 is transmitted via the bearing 4 and the bearing retaining member 13, the load receiving section 74b is deflected. The sensing sections 74c that couple the fixing section 74a fixed to the outer cylinder 62 and the deflected load receiving section 74b are deformed. Strain gauges 67g included in the strain detecting section 67 are stuck to, for example, the side surfaces of the sensing sections 74c. Sticking places of the strain gauges are not limited to the side surfaces of the sensing sections 74c and may be the upper surfaces or the lower surfaces of the sensing sections 74c. Like the strain detecting section 7 explained with reference to FIG. 3, the strain detecting section 67 including the strain gauges 67g forms a Wheatstone bridge with the gauges. Therefore, a voltage signal proportional to an applied voltage and proportional to a strain is output. The output of the strain detecting section 67 is sent to the first controller 104 of the control section 101. As explained above, the strain detecting section 67 detects a load in the axis direction transmitted from the rod 3 to the plate-like member 74 through the screw mechanism 6 and converts the load into an electric signal.

An attachment member for attaching the strain detecting section 67 included in the electric cylinder 61 is not limited to the plate-like member 74 having a rectangular shape in the plane explained above. For example, the attachment member may be a plate-like member (plane-member) 84 shown in FIGS. 11 and 12.

The plate-like member 84 for attaching the strain detecting section 67 has a circular shape in the plane and is held between the first and second cylinders 71 and 72 included in the outer cylinder 62. The plate-like member 84 is configured to include, as shown in FIG. 11, a fixing section 84a held between first and second cylinders 71 and 72, which are provided on the outer circumference, because plural cut-out holes 84d and 84e are provided, a load receiving section 84b that is provided in the center and receives a load in the axis direction applied to the rod 3, and sensing sections 84e for coupling the fixing section 84a and the load receiving section 84b and sensing a strain. In the fixing section 84a, a through-hole 84f for drawing out a wire is provided. FIG. 11(a) is a perspective view of the plate-like member 84 functioning as a strain gauge attachment member. However, the plate-like member 84 is shown with a part thereof cut away for understanding of the structure of the fixing section 84a, the sensing sections 84c, the load receiving section 84b, and the like.

The fixing section 84a side of the plate-like member 84 is held between the flange sections 71a and 71b, whereby the plate-like member 84 is fixed to the outer cylinder 62. The load receiving section 84b receives, via the bearing retaining member 13, a load in the thrust direction received by the bearing 4. When a load in the axis direction applied to the rod 3 is transmitted via the bearing 4 and the bearing retaining member 13, the load receiving section 84b is deflected. The sensing sections 84c that couple the fixing section 84a fixed to the outer cylinder 62 and the deflected load receiving section 84b are deformed. The strain gauges 67g included in the strain detecting section 67 are stuck to, for example, the side surfaces of the sensing sections 84c. Sticking places of the strain gauges are not limited to the side surfaces of the sensing sections 84c and may be the upper surfaces or the lower surfaces of the sensing sections 84c. As explained above, the strain detecting section 67 detects a load in the axis direction transmitted from the rod 3 to the plate-like member 84 through the screw mechanism 6 and converts the load into an electric signal.

Figure 6:
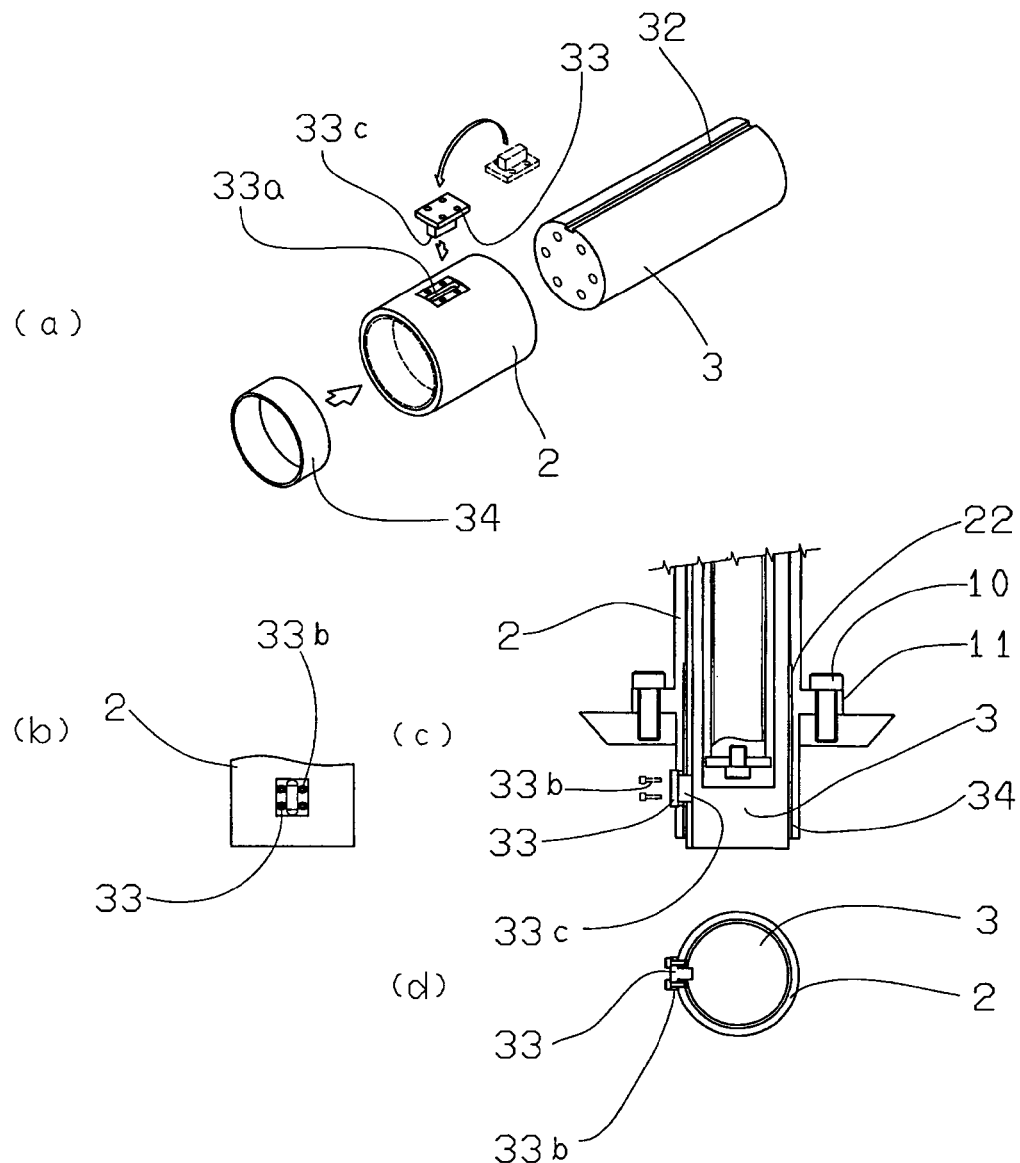
FIG. 6 is a diagram showing another example of structure for regulating the rotation of the rod of the electric cylinder and a diagram of an example in which structure including a slip key is adopted. (a) is a perspective view showing a relation between a groove formed on the outer surface of the rod and a key member in the modification. (b) is a side view showing this key member and the outer cylinder. (c) is a sectional view from the front direction showing a relation among this key member, the outer cylinder, and the rod member. (d) is a sectional view in a direction from the distal end side to the proximal end side of the rod showing a relation between this key member and the outer cylinder.

The electric cylinder 61 shown in FIG. 9 includes, as the rotation regulating mechanism, the groove 32 and the key member 33 included in the slip key structure explained with reference to FIG. 6. However, as explained concerning the electric cylinder 1, the bush members 19 and 29 may be adopted instead of the groove 32 and the key member 33.

The electric cylinder 61 is the same as the electric cylinder 1 in that the electric cylinder 61 includes the motor 12 including the motor body 37, the output shaft 38, and the encoder 39, the transmission mechanism 40, and the reduction gear 44. In the electric cylinder 61, as explained above, the motor 12 is arranged to form a C shape (a U shape). However, the motor 12 may be arranged such that the output shaft 38 and the rotating shaft 5 coincide with each other to form an I shape.

As explained above, the electric cylinder 61 includes the outer cylinder 62, the rod 3, the bearing 4, the rotating shaft 5, the screw mechanism 6, and the strain detecting section 67. Since the electric cylinder 61 can perform load detection with the strain detecting section 67 provided in the outer cylinder 62, it is unnecessary to separately provide a load cell or the like and simplification of the configuration can be realized.

The electric cylinder 61 can prevent a deficiency such as a rupture of an output cable that is necessary when a load cell is provided at the distal end of the rod. When load detection is necessary, the electric cylinder 61 can simplify the configuration and reduces the length in the axis direction to realize a reduction in size of the apparatus. Further, the electric cylinder 61 can realize flexibility of the system configuration in the electric cylinder system 100 and realizes a flexible external configuration of the entire system.

As explained above, the electric cylinder system 100 including the electric cylinder 61 makes the system configuration simple and flexible and realizes the execution of load detection and position detection. Specifically, in the electric cylinder system 100, the strain detecting section 67 functioning as the load detecting means detects a load in the axis direction applied to the rod 3 in a position where the load is transmitted from the rod 3 through the screw mechanism 6. Therefore, it is unnecessary to provide a load cell at the distal end of the rod 3 and the configuration can be simplified. In other words, the electric cylinder system 100 may have the configuration in which the load detecting means is not provided in the rod 3 that acts to extend and retract but is provided in the plate-like member 74 or 84 fixed integrally with the outer cylinder 62, which can also be considered as a fixed side. It is also unnecessary to provide an output cable or the like that is necessary when a load cell is provided at the distal end of the rod. It is possible to prevent a deficiency such as a rupture of this cable due to repeated bending. Therefore, in a system that requires load detection and position detection, the configuration can be simplified and a reduction in size is realized. Further, flexibility of a system configuration and a flexible external configuration of the entire system are realized.

REFERENCE SIGNS LIST 1 electric cylinder
2 outer cylinder
3 rod
4 bearing
5 rotating shaft
6 screw mechanism
7 strain detecting section
11 fixing section
100 electric cylinder system

The invention claimed is:

1. An electric cylinder system comprising;
an electric cylinder; and
a control section that controls the electric cylinder, wherein
the electric cylinder includes: an outer cylinder; a rod configured to be capable of extending, and retracting in an axis direction from an opening on one end side of the outer cylinder; a bearing provided on an inside of the outer cylinder; a rotating shaft rotatably supported by the bearing and driven to rotate with driving force of a motor; a screw mechanism that converts a rotary motion of the rotating shaft into linear motion of the rod and transmits the linear motion; and a load detecting section that detects a load in an axis direction applied to the rod in a position where the load is transmitted from the rod through the screw mechanism,
the control section controls the electric cylinder on the basis of a signal from an encoder of the motor and a signal from the load detecting section,
the outer cylinder includes, on the one end side, a fixing section for fixing the electric cylinder to an attachment place, and
the load detecting section is a strain gauge provided in a position on an outer circumference of the outer cylinder and between a position where the bearing is provided and the fixing section.

2. The electric cylinder system according to claim 1, wherein the strain gauge detects a load in the axis direction applied to a portion between an attachment position of the bearing in the outer cylinder and the fixing section and converts the load into an electric signal.

3. The electric cylinder system according to claim 2, wherein the outer cylinder is formed in a thin shape having a reduced outer diameter of a portion where the strain gauge is attached.

4. The electric cylinder system according to claim 3, wherein the outer cylinder is made of a metal material and formed as a single member.

5. The electric cylinder system according to claim 4, wherein the screw mechanism is a ball screw.

* * * * *